United States Patent [19]

Stark

[11] Patent Number: 5,478,372
[45] Date of Patent: Dec. 26, 1995

[54] HIGH TEMPERATURE, CHEMICAL RESISTANT LAMINATE FOR FILTRATION SYSTEMS

[75] Inventor: Stephen K. Stark, Wilmington, Del.

[73] Assignee: W. L. Gore & Associates, Inc., Newark, Del.

[21] Appl. No.: 385,869

[22] Filed: Feb. 8, 1995

[51] Int. Cl.$^6$ .......................... B01D 39/08; B01D 39/16; B01D 46/04; B32B 5/26
[52] U.S. Cl. .................. 55/521; 55/524; 55/525; 55/528; 156/151; 156/308.2; 210/507; 427/486; 428/35.9; 428/36.91; 428/247; 428/307.3; 428/311.5
[58] Field of Search ........................... 55/521, 524, 525, 55/528; 156/151, 308.2; 210/507; 427/486; 428/35.9, 36.91, 247, 307.3, 311.5

[56] References Cited

U.S. PATENT DOCUMENTS

| | | |
|---|---|---|
| 3,953,566 | 4/1976 | Gore .......................... 264/191 |
| 3,960,651 | 6/1976 | Kometani et al. . |
| 4,011,361 | 3/1977 | Vassiliou et al. . |
| 4,089,783 | 5/1978 | Holyoak . |
| 4,110,392 | 8/1978 | Yamasaki .................. 264/127 |
| 4,128,693 | 12/1978 | Dhami et al. . |
| 4,187,390 | 2/1980 | Gore .......................... 55/486 |
| 4,299,869 | 11/1981 | Casson et al. . |
| 4,600,651 | 7/1986 | Aufdermarsh et al. . |
| 4,770,927 | 9/1988 | Effenberger et al. . |
| 4,778,472 | 10/1988 | Homsy et al. . |
| 4,878,930 | 11/1989 | Manniso et al. . |
| 4,983,434 | 1/1991 | Sassa ....................... 428/36.2 |
| 5,069,959 | 12/1991 | Gentile et al. . |
| 5,103,067 | 4/1992 | Aldissi . |
| 5,104,727 | 4/1992 | Wnenchak . |
| 5,108,836 | 4/1992 | Ocampo et al. . |
| 5,180,884 | 1/1993 | Aldissi . |
| 5,207,812 | 5/1993 | Tronto et al. . |
| 5,364,682 | 11/1994 | Tanaka et al. . |

OTHER PUBLICATIONS

*Chemical Abstracts* 95:106241.
*Chemical Abstracts* 94:332878.
*Chemical Abstracts* 94:208660.
*Chemical Abstracts* 93:242448.
*Chemical Abstracts* 93:214217.
*Chemical Abstracts* 87:207997.
*Chemical Abstracts* 107:219562.

*Primary Examiner*—James C. Cannon

[57] ABSTRACT

A self-supporting laminate formed from an expanded polytetrafluoroethylene membrane material and a coated metal mesh material is described that is self-supporting and can be formed into a pleated filter member.

7 Claims, 2 Drawing Sheets

HIGH TEMPERATURE, CHEMICAL RESISTANT LAMINATE FOR FILTRATION SYSTEMS

FIELD OF THE INVENTION

This invention provides high temperature, chemically resistant membrane laminates for use in air filtration systems. The high temperature, chemically resistant membrane laminate can be used to filter solids from a gas stream or treat industrial gas streams. The laminate can be provided as a cartridge filter for filter systems designed to remove solid particles, such as, dust from large volumes of gas in industrial sweepers, bag houses, or plenum-type dust collectors.

BACKGROUND OF THE INVENTION

Filtration systems using panel filters or cartridge filters employ a porous filter material to filter particulate from a gaseous stream. The removed dust or particulate solid is retained on an up-stream surface of the filter medium as the gas passes through. Many of the environments in which panel or cartridge filters are used must be able to withstand elevated temperatures of approximately 400° F. or higher. Current high efficiency fabric filtration media that operate in this high temperature and corrosive environment consist primarily of two types of filters. One is a fiberglass fabric with a layer of expanded polytetrafluoroethylene (ePTFE) membrane laminated to the fabric surface. The other is a felt constructed of stretched porous polytetrafluoroethylene membrane material. U.S. Pat. No. 4,983,434 to Sassa exemplifies the latter. In the Sassa patent, a polymer adhesive, such as a fluorinated ethylene propylene (FEP) copolymer, is coated onto a felt and a layer of expanded porous polytetrafluoroethylene membrane material, prepared in accordance with the teachings of U.S. Pat. Nos. 4,187,390; 4,110,392; and 3,953,566, is laminated to the FEP containing side.

Both the fiberglass fabric-polytetrafluoroethylene laminate and the expanded porous polytetrafluoroethylene felt filtration laminate are capable of operating in corrosive environments at temperatures of about 500° F., with the latter being more resistant than the fiberglass laminate. However, when these materials are constructed into a pleated cartridge, they must be supported by an internal wire cage with external metal support with stays between each pleat. U.S. Pat. No. 4,878,930 to Manniso, et al., exemplifies the pleated cartridge support system that would be used with the membrane of the Sassa patent. The support taught by the Manniso patent is required because the prior art filter materials are nonrigid in nature and cannot retain a pleated shape without supplemental support. The supplemental support renders the cartridges more expensive, and subject to corrosion at the support site with reduced surface area available for filtering.

Rigid composite polyamide and polyaramid non-woven or felt backed laminates are available, but most laminates are limited to applications involving temperatures below 400° F. The most common variety are non-woven polyester backed laminates which are limited to 260° F. Thus, a need exists for a porous polytetrafluoroethylene membrane laminate that functions as a self-supporting and pleated filter element for lightweight high temperature use, without requiring the cage and support structures utilized in the filter cartridge art.

The laminates of the present invention avoid the drawbacks of the prior art, e.g., avoid the non-rigid nature of the prior art materials, and provides a self-supporting membrane laminate that is capable of withstanding temperatures of up to 500° F. or greater in the presence of harsh chemicals.

SUMMARY OF THE INVENTION

This invention is a filtration laminate of a porous polytetrafluoroethylene membrane adhered to a woven metallic mesh. The laminate is high temperature resistant and corrosion resistant. The mesh has a layer of a thermoplastic polyether ether ketone (PEEK) coated on it. The laminate can be formed into a self-supporting pleated filter membrane.

Another aspect of the invention is a method for uniformly coating a metallic mesh material and laminating the coated metal mesh to stretched porous polytetrafluoroethylene to form a self-supporting laminate membrane material.

Another aspect of the invention is a pleated filter element for use in the treatment of gaseous streams.

Other features of the present invention will become apparent from the following detailed description taken in conjunction with the drawings.

DETAILED DESCRIPTION OF THE INVENTION

The present invention comprises an air filtration laminate that can be used in a filter cartridge. The laminate can be planar, pleated or formed into any desired shape. The air filtration laminate includes a metallic mesh material, such as, stainless steel, nichrome or copper, that contains a coating of PEEK, on the metal wires of the mesh. A layer of stretched porous polytetrafluoroethylene is adhered to the coated mesh to form the laminate.

The stretched porous PTFE membrane has a microstructure of nodes interconnected with fibrils. The pores are defined by the open spaces between the nodes and fibrils, and extend in irregular fashion from one side of the membrane to the other. The membrane is described in U.S. Pat. No. 4,187,390, incorporated herein by reference.

The PEEK, in powder form, is electrostatically coated onto the metallic mesh to provide the layer of coating while at the same time making certain that the interstices between the discrete wires of the metal mesh remain open. As a result, the PEEK polymer resin forms a layer that covers the metal mesh wires. The coating provides adhesion for subsequent lamination of a stretched porous polytetrafluoroethylene membrane (PTFE). The coating aids in improving the flexibility and abrasion resistance of the laminate. During lamination, the coating melts into the stretched, porous polytetrafluoroethylene membrane at the point of contact between the coated wire of the mesh and the PTFE membrane. These points of contact provide bond sites that adhere the membrane to the coated metal mesh, while the adjacent areas allow air to pass through the laminate. The result is a lightweight, membrane filtration laminate which can operate in harsh chemical environments at temperatures up to, or slightly greater than, 500° F. (260° C.). The laminates can be formed into self-supporting pleats and formed into filter cartridges. The laminates are also useful for the construction of pleated panel filters. Other applications may be possible where the laminate is used in an unpleated form.

Figure 1:
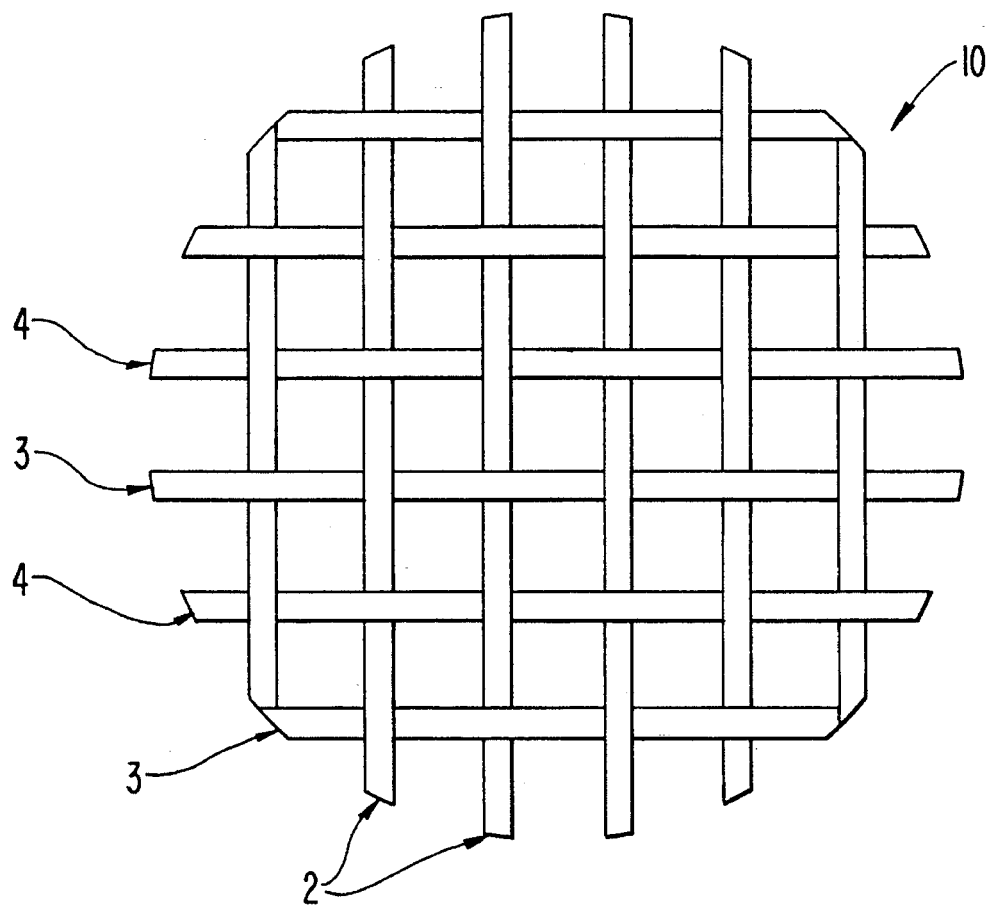
FIG. 1 is a top view of a coated metallic mesh element.
Figure 2:
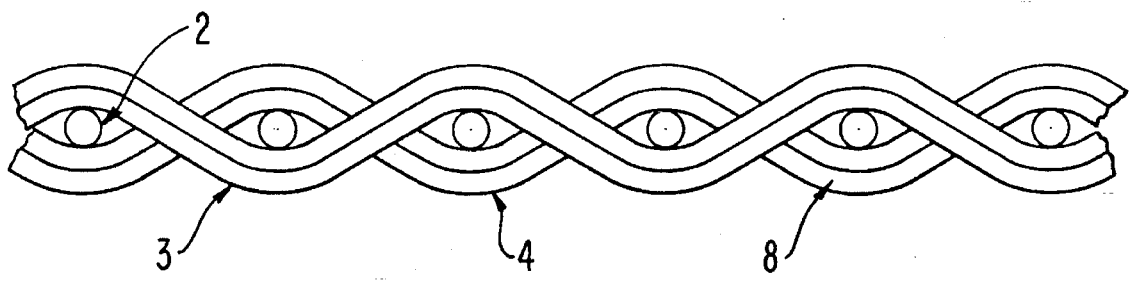
FIG. 2 is an edge view of a coated metallic mesh element.

The invention will now be described with reference to FIGS. 1–4 of the drawings and the following, non-limiting, example of forming a structure suitable for providing a pleated, self-supporting air filtration laminate. FIGS. 1 and 2 show a coated stainless steel metallic mesh 10 formed from wires 3 and 4 weaved around wires 2. The wires 2, 3 and 4, respectively, have an electrostatically provided PEEK coating 8 that is deposited on the wires. Coated mesh 10 is prepared by taking a 6" by 6" square sample of 30 mesh, 304 stainless steel wire that has been cut from a 48 inch roll (obtained from Southwestern Wire Cloth Co. of Shelby, N.C.). The wire strands are 0.0065 inches thick with 0.027 inch square openings. A continuous layer of PEEK obtained from ICI Advanced Materials, Exton, Pa. is electrostatically coated on the metal mesh to form a 0.002–0.005 inch thick layer 8. The resulting coating is uniformly deposited on the wires, without any bridging by the PEEK coating across the square openings. Thus, air flow through the metal mesh was not blocked.

Figure 3:
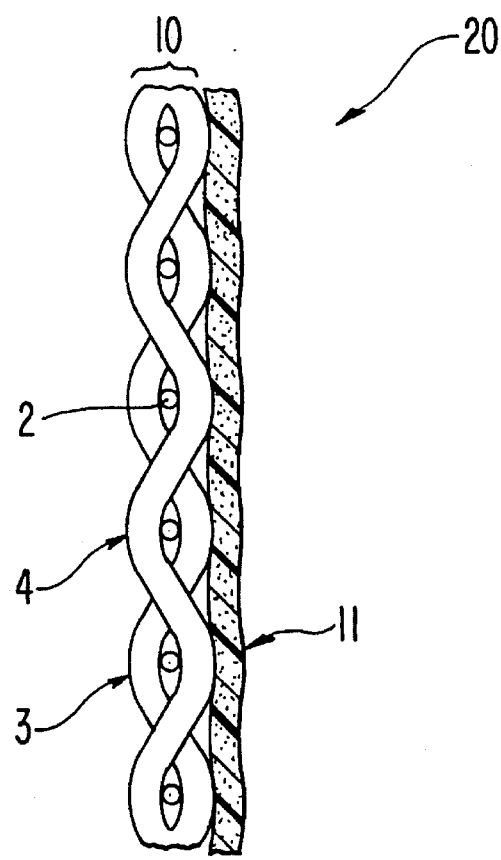
FIG. 3 is an edge view of PEEK coated metallic mesh element laminated to an expanded polytetrafluoroethylene layer.

In FIG. 3, laminate 20 is formed from a layer of stretched porous polytetrafluoroethylene 11 that is laminated to coated mesh 10. Lamination is accomplished by hot rolling layer 11 at 430° C. using a hot roll laminator supplied by Talboys Engineering Corporation to the coated mesh 10. The lamination involves applying pressure of 25 pounds per square inch at a lamination speed of 2 feet per minute. The resulting permeability of the sample is 14 cubic feet per minute per square foot at a pressure drop of 0.5 inch water gauge.

Figure 4:
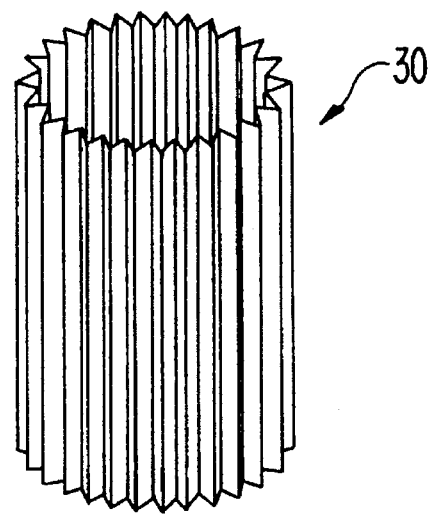
FIG. 4 shows a pleated filtered member formed from the laminate of FIG. 3, which is self-supporting and used in a filter module.

In FIG. 4, the laminate 20 of FIG. 3 is pleated and formed into a tubular laminate 30 that will have end caps (not shown) fitted at the ends thereof to form a filter unit.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

I claim:

1. A filter laminate comprising:

(a) a stretched porous polytetrafluoroethylene membrane; and (b) a metallic mesh containing a coating of polyether ether ketone on the metal wires of the mesh.

2. The filter laminate of claim 1 wherein the metallic mesh is stainless steel.

3. The filter laminate of claim 1 wherein the filter laminate is pleated.

4. The filter laminate of claim 1 wherein the laminate is in the form of a cylinder.

5. The filter laminate of claim 1 wherein the laminate is pleated and is in the form of a cylinder.

6. A method of preparing a filter laminate comprising:

(a) providing a metal mesh material;

(b) coating the metal mesh with a layer of polyether ether ketone so that the interstices between adjacent wires of said mesh remain open for gas flow; and (c) laminating a layer of stretched porous polytetrafluoroethylene to said coated metal mesh.

7. A method according to claim 6 wherein the coating is electrostatically applied.

* * * * *